April 18, 1961 G. RICHARDS 2,980,216
CONSTRUCTIONAL METALWORK
Filed March 3, 1958 5 Sheets-Sheet 1
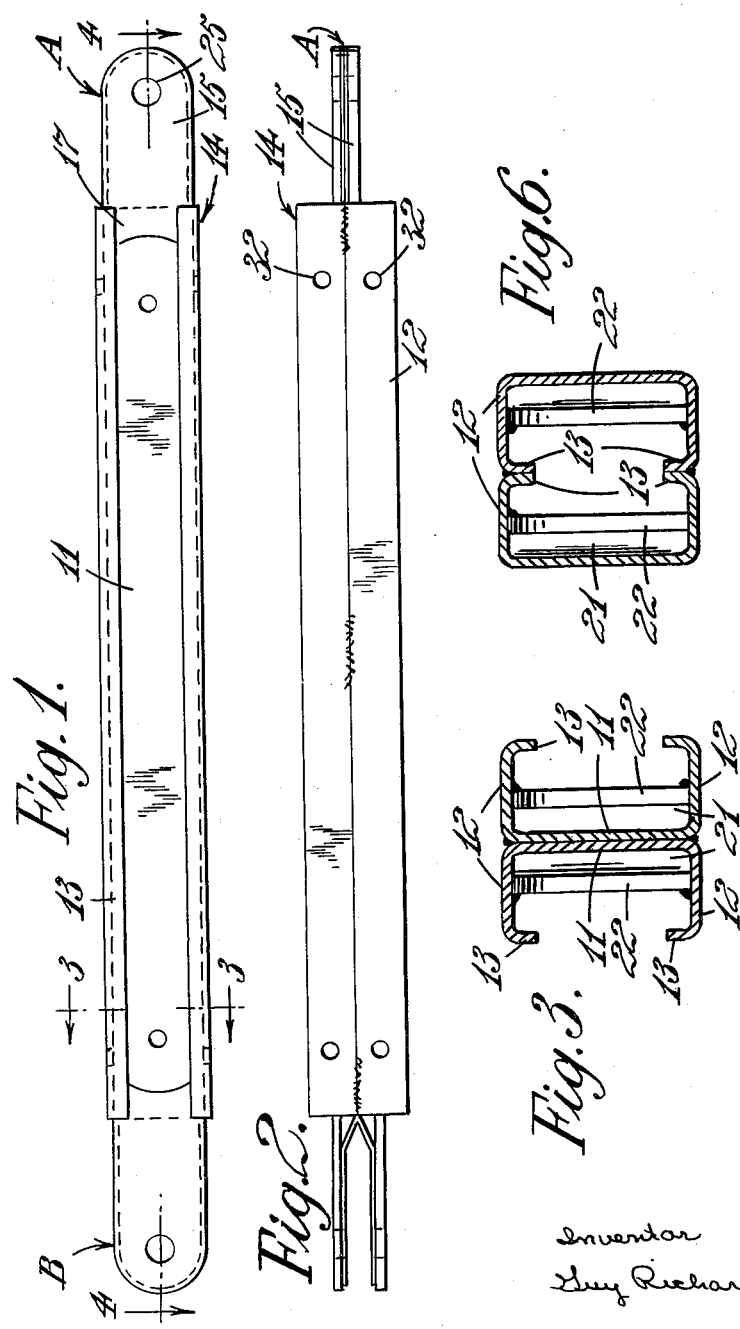

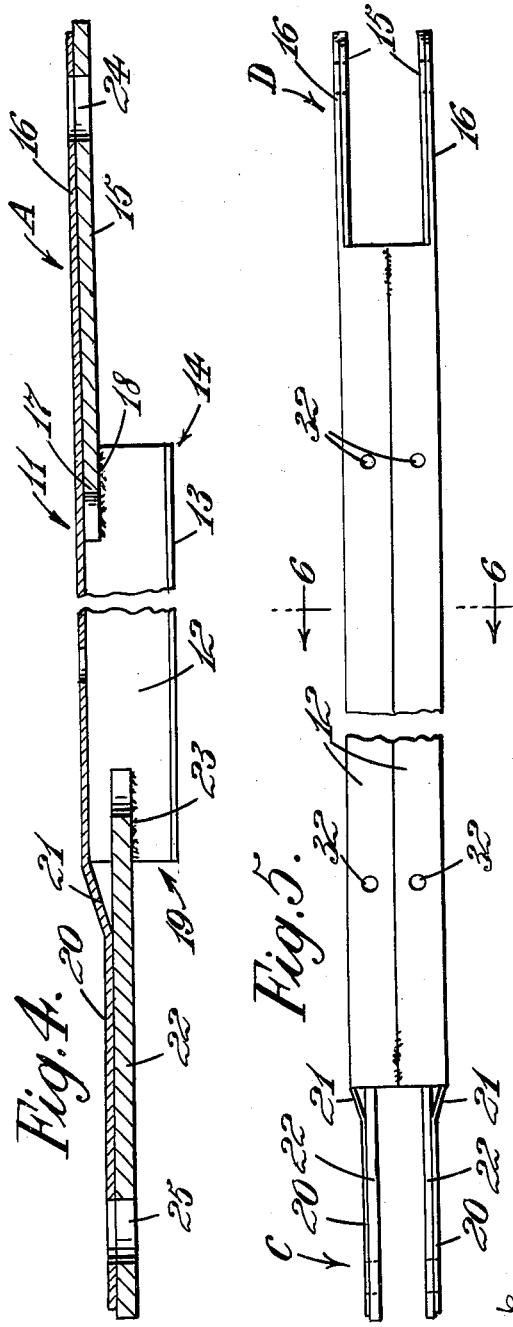

April 18, 1961 G. RICHARDS 2,980,216
CONSTRUCTIONAL METALWORK
Filed March 3, 1958 5 Sheets-Sheet 3
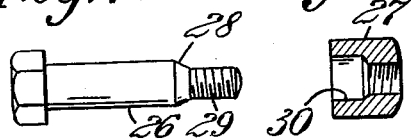
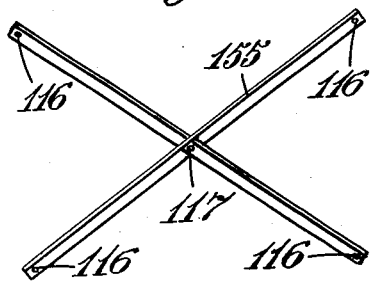
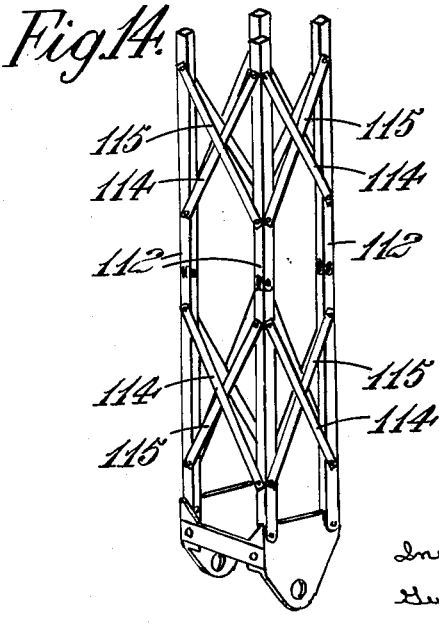
Inventor
Guy Richards
By
Watson, Cole, Grindle & Watson
(attorneys)

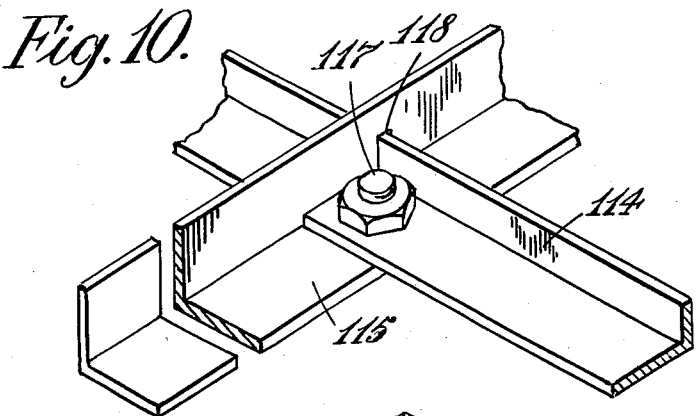
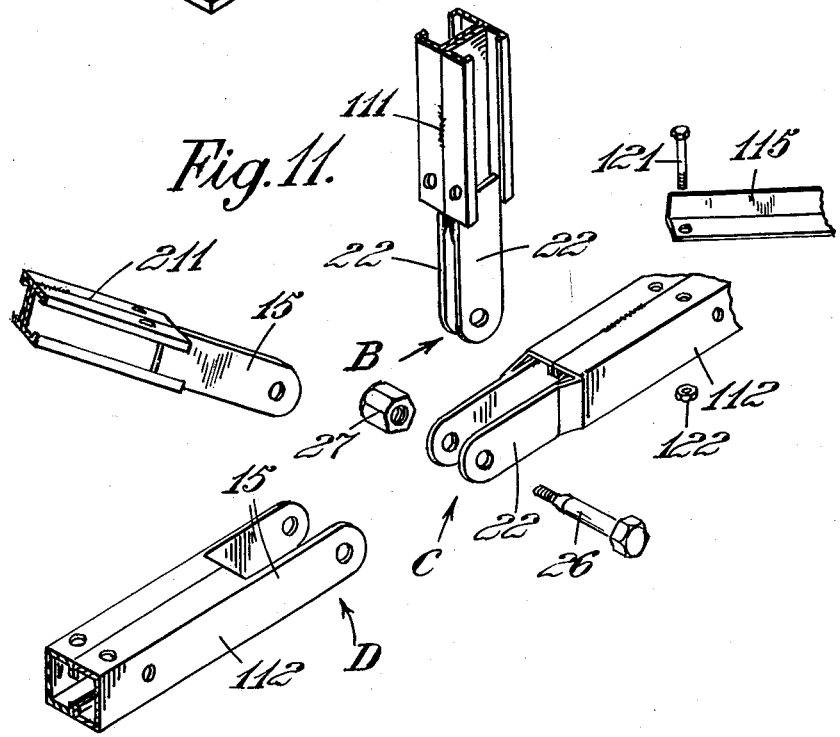

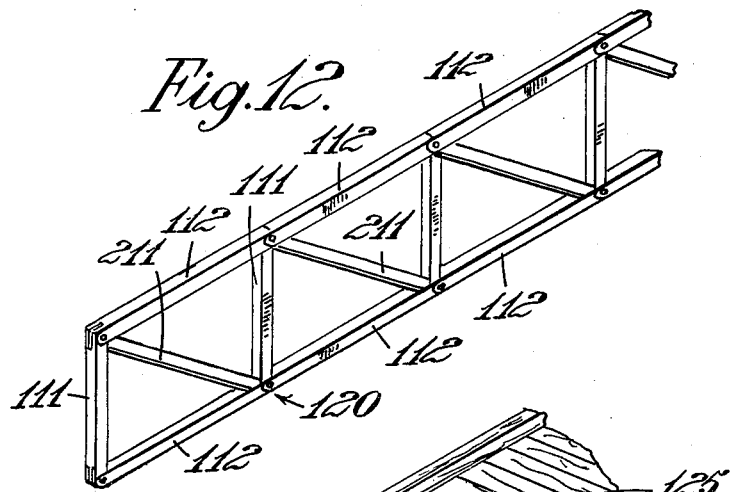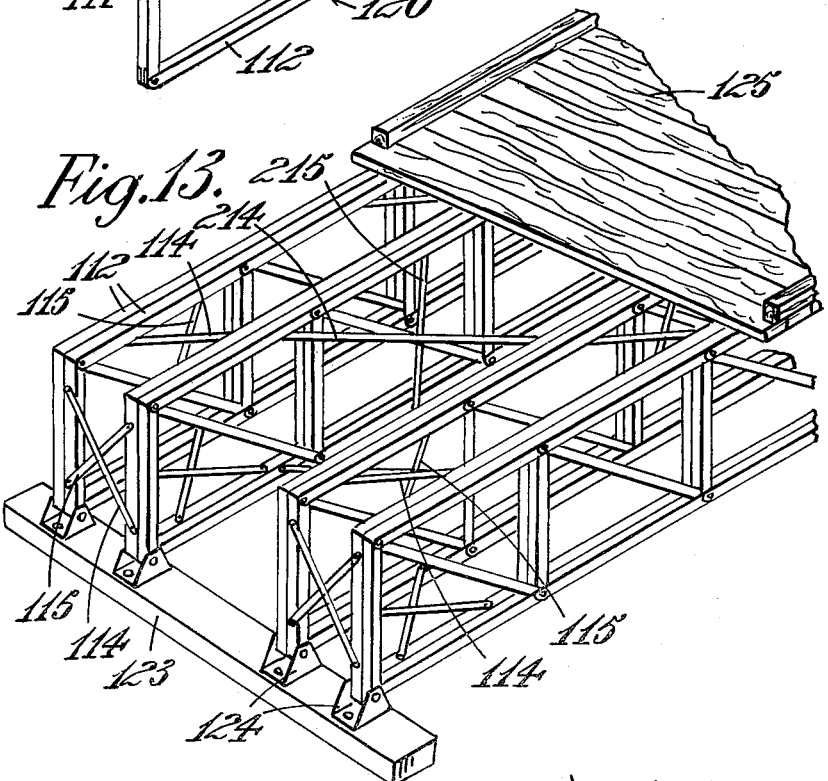

United States Patent Office 2,980,216
Patented Apr. 18, 1961

2,980,216
CONSTRUCTIONAL METALWORK
Guy Richards, London, England, assignor to Formwork Patents Limited, London, England, a company of Great Britain
Filed Mar. 3, 1958, Ser. No. 718,758
5 Claims. (Cl. 189—37)

This invention comprises improvements in or relating to constructional metalwork.

In almost every form of construction work as well as in established industry, it is frequently necessary to provide temporary structure in the form of staging to support loads, lifting devices such as poles or derricks and bridges for vehicles or conveyor belts.

An essential requirement of such temporary structures is that they can be erected and dismantled without cutting and wasting material. One way in which this can be achieved is by connecting together with pins members of suitable length to form triangulated plain frames which, by their nature, can be extended in any direction to form recognised structural outlines, for example trusses, portals and the like and two similar plain frames can be set one behind the other and braced together laterally to give lateral stiffness.

The present invention comprises a constructional system having in combination a set of structural members of lengths adapted to fit together to form a triangulated structure, each member having a plurality of parallel plate-like ears at each end pierced to receive joint pins, the spacing between the ears being different from member to member so that the ears of one member will interfit with the ears of others. In one form the lengths of the structural members are so related to one another that they form right-angled triangles, for example in the proportions of 3, 4 and 5 for the three sides, but they can be of such length as to form equilateral or isosceles triangles if preferred.

The members themselves can conveniently be built up from pairs of elements of channel section, welded either back to back (to form a member of I section) or flange to flange (to form a member of box section). By manufacturing each element with a plate welded into the base of the channel at one end to constitute an ear and with a plate for an ear at the other end welded to the back after it has been joggled, and suitably proportioning the channels, the plates and the joggling, it is possible to make up both I beams and box-section members from the same elements in such a way that, if some are made up as box-sections and others as I beams, all the interfitting of ears required at joints automatically comes correct.

The following is a description by way of example of one system of construction in accordance with the invention, reference being made to the accompanying drawings in which:

Figure 1 is an elevation of a structural member of the system;
Figure 2 is a plan of the same;
Figure 3 is a section on line 3—3 of Figure 1, but to a larger scale and looking in the direction of the arrows;
Figure 4 is a horizontal section on the line 4—4 of Figure 1, looking in the direction of the arrows;
Figure 5 is a plan of a second structural member;
Figure 6 is a section on line 6—6 of Figure 5, looking in the direction of the arrows;
Figure 7 is a detail of a connecting bolt;
Figure 8 is a nut for the same;
Figure 9 shows in plan a form of diagonal bracing;
Figure 10 is a perspective detail of part of Figure 9 to a larger scale;
Figure 11 is an "exploded" perspective of a typical joint showing how the parts come together;
Figure 12 is a perspective view of a simple type of girder built up from the parts shown in Figures 1 to 11;
Figure 13 is a perspective view of part of a more complex structure; and
Figure 14 is a perspective view of part of a built-up column or jib.

The basic element in the example shown is a metallic lipped channel 11 shown in section in Figure 3 (in which two such channels appear back to back). The channel has flanges 12 with inturned lips 13 along the edges of the flanges and may be of any convenient size but preferably of proportions approximately as shown. For example, in a particular case the depth is made 3½₂″ and width overall of flanges 1³⁵⁄₆₄″. The fractional addition to the size of 1½″ is to afford clearance, on assembly of units together.

At one end 14 of the channel 11 the flanges are cut off for a short distance and a plate-ear 15 is welded to the inside face of the tongue 16 left by the web (see Figure 4). This ear is a little longer than the tongue and of the same width so that it can extend a short distance back into the channel proper as shown at 17, where it is welded as shown at 18 to the inside of the flanges 12. At the other end 19 of the channel the flanges are similarly cut off but the tongue 20 is given a parallel offset or joggle afforded by the metal of the back of the channel at 21, of an amount equal to a quarter the width of the flange 12; thereafter a plate-ear 22, of the same thickness and width as that of ear 15 at the other end, is welded on to the inside face of the joggled tongue and this plate likewise extends into the body of the channel a short distance where it is welded at 23 to the inside of the flanges. Holes 24 at one end of the channel and 25 at the other end and of a diameter approximately equal to one third of the depth of the channel, are drilled a short distance from the ends of the ears. Variation in the length of the component is made by altering the length of the channel 11 between the end tongues. The thickness of the ears 15, 22, taken together with the thickness of the tongues 16, 20, is, the like amount of the joggling, a quarter the width of the flange 12.

Components as described above can be welded together in pairs of equal length to form two types of members; one, shown in Figures 2 and 3, in which the channels are welded back to back to form an I section; the other, shown in Figures 5 and 6, in which the flange lips 13 are welded in contact to form a box-section, similar ends (15 or 22) being placed together in both cases.

If the tongue ends (i.e. 15) of the I section and box-section are given distinguishing marks A and D respectively and the joggled ends are lettered B and C respectively for I and box-section, then end A can be inserted into the gap between the two tongues of end B, similarly B into C and C into D. Thus two, three or four members can be connected together by passing a bolt (22, Figure 7) through the holes in the respective tongues and tightening up with a nut (27, Figure 8), provided that the members are selected so that there is only one end of each mark at the connection. If four members are so connected, the tongues build up a solid interlapping joint; where only two or three members occur (as at the ends of trusses) washers of the same thickness as the tongues can be inserted as packing which thus enables a joint always to be drawn tight with the same length of bolt. The bolts 26 have tapered sections 28 near their ends, with a smaller screwed end 29. The nuts 27 are drilled out, as at 30, to allow the tapered portions 28 to enter them. If members are made of box-section in 4 foot lengths and I section in 3 and 5 foot lengths, the 5 foot lengths make the diagonals of a truss, which will be 3 feet deep with four-foot panels. In any truss thus constructed, the top and bottom chords must be alike and the diagonals and verticals of opposite section to the chords.

In isolated cases where five members occur at a joint as at the centre panel of a truss where the diagonal bracing changes direction, an additional member called an "open box" member is used. This comprises two basic channel components with the tongues at both ends plain i.e. neither of the tongues are joggled. These two components are welded together with their flanges facing each other but held apart by batten plates, so that the gap between the tongues at each end equals the depth of the channel used and thus enables the tongue to fit over the end D of the top and bottom members of the truss.

One feature of this system of members which is of great importance is that the tongues at each end of each type of member, that is, whether of the I-section or the box-section, are symmetrical about the neutral axis of the member; thus, if members are correctly erected, it is impossible to load any member eccentrically. It should also be noted that considerable friction is induced in each joint due to the interleaving of the tongues as each presents four faces per member; when drawn tight by the bolt at the connection, a considerable "encastré" effect is imparted to each member in the plane of the truss. For the same reason great rigidity is imparted to the joints in a plane normal to the truss which is of benefit in maintaining the compression chord true under load.

One form of truss which can be built up in accordance with the invention is shown in Figure 12 in which box members 112 form the top and bottom chords, are spaced apart by verticals 111 and diagonals 211 which are of I-section. That is, the members 111 and 211 are similar to Figures 1 and 2 in structure, while the chord members 112 are similar to Figures 5 and 6 in structure.

Trusses may be doubled by placing two trusses side by side throughout their length and using double length bolts at the connections. This is shown at 112 in Figure 13. Figure 13 also shows how two similar trusses can be set up which are spaced apart from one another by cross-bracing members 114, 115 at intervals. In the drawings, Figures 1 to 6, holes 32 are shown in the flanges 12 which are provided to receive bolts of cross-bracing members. The construction of the members 114, 115 is shown in Figures 10 and 11. Each member of the cross-bracing has a bolt hole 116 at each end and they are united together by a bolt 117 where they cross in the centre. As clearly shown in Figure 10, the member 114 has a shallower flange than the member 115 and passes through a slot 118 in the outstanding flange of the member 115. This enables the cross-bracing members to cross each other without reversing their flanges and putting them together back to back, and permits the flanges to be allowed to extend right up to the bolt holes 116. If the angles were put together back to back, the outstanding flange of one of them would have to be cut away near the bolt hole to enable it to fit on to the holes 32 in the truss members, and this would result in weakening of the cross-bracing member to an undesirable extent. The slack allowed in the slot 118 is sufficient to permit the angle of the cross-bracing to be varied a little, so as to secure its correspondence between the ends of the braces and the spacing of the holes 32.

The way in which the joints come together is indicated clearly in Figure 11, which is a perspective view of the parts at a joint such as the one marked 120 in Figure 12. As can be seen, the lower end of the diagonal brace-member 211 is similar to the parts at the end A of Figures 1 and 2, while the lower end of the vertical member 111 is similar to the end B of Figures 1 and 2, with ears 22 spaced apart sufficiently to fit over the ears 15 of the member 211. The end of one of the members 112 is similar to the end C of the member shown in Figure 5, while the end of the other member 112 is similar to the end D. The position of one of the cross-brace members 115 and of the bolt 121 therefor, together with its nut 122, is also shown in Figure 11. From this it will be clear how even a complex multiple girder such as that shown in Figure 13, can be built up. The end of this girder rests on a timber bearer 123 to which it is secured by metal plates having upstanding ears 124 in which the bottom corners of the various trusses are secured. Four double trusses are provided according to Figure 13, which are in two groups of two spaced apart by diagonal braces 114, 115 and further spaced apart by other diagonal braces 214, 215. The braces 214, 215 differ from those shown in Figures 9 and 10 only in being longer. The result is a bridge which may be provided with a wooden floor 125. It will be obvious that the trusses may be alternatively built up into columns or cantilevers and other engineering structures such as crane jibs and the like.

Trusses may be cambered by providing members to be used as diagonals (assumed to be in tension) which are slightly shorter than the theoretical amount.

It is not essential that trusses should all be built up in the "Pratt" type of truss shown in Figure 12. A "Warren" type of truss may be built up if desired in which all the members are of the same length and form equilateral triangles. Again, if chord members such as 112 are provided which are shorter in the underside of the truss than those in the upper side, an arch truss can be built up. This would normally be of the "Warren" type.

Figure 14 shows part of a member which may be a column or a crane-jib or the like and which is built up in a different way, without any verticals 111 and diagonals 211 such as are shown in Figure 12. In the case of Figure 14 four corner verticals are built up by series of double-channel members whether of I section as Figure 3 or of box-section as Figure 6, joined end to end, and these are spaced apart by diagonal bracing similar to that of Figures 9 and 10 on all four sides.

I claim:

1. A constructional framing joint comprising four chord members each having one end in close juxtaposition to an end of each of the other members; two of said chord members each comprising two channel elements rigidly secured together in web-to-web contact, each of said channel elements comprising the usual web and two flanges, the flanges extending at substantially right angles from the respective edges of each web, an attaching ear at one end of each of said elements and comprising a virtual prolongation of its web beyond the ends of the flanges and another attaching ear at the opposite end of each of said elements, which latter ear extends in a generally longitudinal direction from the opposite ends of the flanges of said element and parallel to the plane of said web, the planes of the ears at the first end of said element being respectively closely adjacent the planes of the corresponding ears at the second end, whereby when two of such chord members are joined at their ends to lie in the same plane, the two first named ears of one chord member will interfit between and contact the second named ears of the other chord member for firm attachment; the other two chord members each comprising two channel elements, each channel element comprising the usual web and two flanges, the flanges extending at substantially right angles from the respective edges of said web, means rigidly securing said chord elements together along the edges of corresopnding flanges so that the webs face outwardly, an attaching ear at one end of each of said elements and comprising a virtual prolongation of its web beyond the ends of the flanges and another attaching ear at the opposite end of each of said elements, which latter ear extends in a generally longitudinal direction from the opposite ends of the flanges of said element and parallel to the plane of said web, the planes of the ears at the first end of said element being respectively closely adjacent the planes of the corresponding ears at the second end, whereby when two of such chord members are joined at their ends to lie in the same plane, the two first named ears of one chord member will interfit between and contact the second named ears of the other chord member for firm attachment; all of said ears being each of a thickness approximately equal to one-fourth of the width of the flanges of the channel elements; and in each of said chord members the median plane of said second named ears being spaced from the said plane of said first named or web-extension ears a distance approximately equal to one-fourth of the width of the channel flanges; the ears of all four chord members interdigitated so that the contacting web-extension ears of one of the first named chord members are centrally disposed and interfit between the second named ears of the other similar chord member; the said second ears of said first named chord member interfit between the second named or offset ears of one of the second named chord members, and finally the said second named ears of the second chord member interfit between the first named or web-extension ears of the other of the second named chord members; and means for securing the eight overlapping and closely adjacent ears together at the joint.

2. A chord member for a framing structure or the like, which comprises two channel elements rigidly secured together in web-to-web contact, each of said channel elements comprising the usual web and two flanges; the flanges extending at substantially right angles from the respective edges of said web; an attaching ear at one end of each of said elements and comprising a virtual prolongation of its web beyond the ends of the flanges, and another attaching ear at the opposite end of each of said elements, which latter ear extends in a generally longitudinal direction from the opposite ends of the flanges of said element and parallel to the plane of said web; the planes of the ears at the first end of said element being respectively closely adjacent the planes of the corresponding ears at the second end, whereby when two of such chord members are joined at their ends to lie in the same plane the two first named ears of one chord member will interfit between and contact the second named ears of the other chord member for firm attachment.

3. The constructional element as set forth in claim 2 in which the median plane of said second named ear is displaced from the median plane of said first named ear a distance approximately equal to one-fourth of the width of the flanges and the thickness of each ear is approximately equal to one-fourth of said width.

4. A chord member for a framing structure or the like, which comprises two channel elements, each comprising the usual web and two flanges, the flanges extending at substantially right angles from the respective edges of said web; means rigidly securing said chord elements together along the edges of corresponding flanges so that the webs face outwardly; an attaching ear at one end of each of said elements and comprising a virtual prolongation of its web beyond the ends of the flanges, and another attaching ear at the opposite end of each of said elements, which latter ear extends in a generally longitudinal direction from the opposite ends of the flanges of said element and parallel to the plane of said web; the planes of the ears at the first end of said element being respectively closely adjacent the planes of the corresponding ears at the second end, whereby when two of such chord members are joined at their ends to lie in the same plane, the two second named ears of one chord member will interfit between and contact the first named ears of the other chord member for firm attachment.

5. The constructional element as set forth in claim 4 in which the median plane of said second named ear is displaced from the median plane of said first named ear a distance approximately equal to one-fourth of the width of the flanges and the thickness of each ear is approximately equal to one-fourth of said width.

References Cited in the file of this patent

UNITED STATES PATENTS

| Re. 14,444 | Furry | Mar. 12, 1918 |
| 384,196 | Duval | June 5, 1888 |
| 1,387,542 | Healey | Aug. 16, 1921 |
| 1,738,854 | Thies | Dec. 10, 1929 |
| 1,846,567 | Murray | Feb. 23, 1932 |
| 1,942,391 | Miller | Jan. 2, 1934 |
| 2,007,898 | Ragsdale | July 9, 1935 |
| 2,376,023 | Bailey | May 15, 1945 |
| 2,559,741 | Wachsmann | July 10, 1951 |
| 2,687,102 | Rongved | Aug. 24, 1954 |

FOREIGN PATENTS

| 464,393 | Italy | 1951 |
| 375,009 | Great Britain | 1932 |
| 574,311 | Great Britain | of 1945 |